(12) United States Patent
Belanger et al.

(10) Patent No.: US 10,207,685 B2
(45) Date of Patent: Feb. 19, 2019

(54) METHOD OF FORMING A LIGHTED DRYER HOUSING

(71) Applicant: WashMe Properties, LLC, Northville, MI (US)

(72) Inventors: Michael J. Belanger, Northville, MI (US); Barry S. Turner, Novi, MI (US)

(73) Assignee: WashMe Properties, LLC, Northville, MI (US)

( * ) Notice: Subject to any disclaimer, the term of this patent is extended or adjusted under 35 U.S.C. 154(b) by 247 days.

(21) Appl. No.: 15/068,602

(22) Filed: Mar. 13, 2016

(65) Prior Publication Data

US 2017/0057470 A1   Mar. 2, 2017

Related U.S. Application Data

(60) Provisional application No. 62/208,924, filed on Aug. 24, 2015.

(51) Int. Cl.
*B60S 3/00* (2006.01)
*B60S 3/04* (2006.01)
(Continued)

(52) U.S. Cl.
CPC .............. *B60S 3/002* (2013.01); *B29C 41/04* (2013.01); *B29C 49/00* (2013.01); *B60S 3/04* (2013.01);
(Continued)

(58) Field of Classification Search
CPC . B60S 3/002; B60S 3/04; B29C 41/00; B29C 49/00; B29C 45/1704; B29C 49/06; B29C 2049/2069; F26B 21/004
See application file for complete search history.

(56) References Cited

U.S. PATENT DOCUMENTS 5,221,538 A * 6/1993 Gasami ............... B29C 45/0062
                                                      264/328.11
6,709,530 B1   3/2004 Dietsch
(Continued)

FOREIGN PATENT DOCUMENTS

DE   202013103829 U1   11/2014
EP       1364847 A2    11/2003
JP      H1159341 A      3/1999

OTHER PUBLICATIONS

European International Search Report dated Nov. 2, 2016.

*Primary Examiner* — Stella K Yi
(74) *Attorney, Agent, or Firm* — John S. Artz; Dickinson Wright PLLC

(57) ABSTRACT

A lighted dryer assembly for a vehicle wash system including a housing portion, having a head portion, a body portion, and an outlet portion. The head portion includes an air inlet portion for drawing air into the head portion and an outlet for passing the air to the body portion. The outlet portion has a plurality of exit nozzles that are configured to emit high velocity air therefrom for removing water from an exterior surface of a vehicle while disposed in a vehicle treatment area. The body portion includes an upper portion where air is received from the head portion and a lower portion disposed remote from the upper portion. A light source is disposed within the housing portion and configured to emit light that can be seen by a vehicle disposed in the vehicle treatment area.

21 Claims, 11 Drawing Sheets

(51) Int. Cl.
*B29C 41/04* (2006.01)
*B29C 49/00* (2006.01)
*B29K 75/00* (2006.01)
*B29L 22/00* (2006.01)
*F26B 21/00* (2006.01)

(52) U.S. Cl.
CPC ........ *F26B 21/004* (2013.01); *B29K 2075/00* (2013.01); *B29K 2995/0029* (2013.01); *B29L 2022/007* (2013.01); *F26B 2210/12* (2013.01)

(56) References Cited

U.S. PATENT DOCUMENTS

| | | | | |
|---|---|---|---|---|
| 2003/0205092 | A1* | 11/2003 | McElhanon | G01N 21/70 |
| | | | | 73/800 |
| 2008/0232958 | A1* | 9/2008 | Weyandt | F04D 25/166 |
| | | | | 415/206 |
| 2011/0277792 | A1* | 11/2011 | Turner | B60S 3/00 |
| | | | | 134/18 |
| 2013/0185876 | A1 | 7/2013 | Belanger | |

* cited by examiner

METHOD OF FORMING A LIGHTED DRYER HOUSING

CROSS-REFERENCE TO RELATED APPLICATIONS

The present application claims priority to U.S. Provisional Patent Application Ser. No. 62/208,924, entitled "Vehicle Wash Dryer Assembly", filed Aug. 24, 2015, which is hereby incorporated by reference as though set forth fully herein.

TECHNICAL FIELD

The present disclosure relates generally to a lighted vehicle wash component. More particularly, the present disclosure relates to a dryer assembly for a vehicle wash facility which employs lights to provide improved aesthetics.

BACKGROUND OF THE DISCLOSURE

Vehicle wash facilities are generally known to have dark and dirty environments, which can make them unattractive to customers and potential customers. This environment results, in part, from the fact that current rotary brush components typically employ a cylindrical central hub design that is densely populated with a plurality of washing elements such that the hub is not visible either at rest or during operation. This densely populated hub also serves to block a great deal of light to a vehicle occupant as the wash component approaches the vehicle during the vehicle wash process due to the large volume of the washing elements. This can result in a significant darkening of the vehicle interior and an unpleasant wash experience for the vehicle occupant. Combine this darkness with windshields and side windows that are often covered with soapy water and visibility for vehicle occupants within current vehicle wash facilities is generally very low.

Consequently, some wash owners have made an attempt to brighten this environment and enhance a user's wash experience though the use of lighted arches and signs, to create somewhat of a "carnival" feel. Many vehicle wash facilities also employ lights and lighted signs as a way to advertise extra wash services like tire shine, sealer wax, and triple foam as well as to drive traffic to and create more revenue for their vehicle wash facility. While these lighted arches and lighted signs may be effective in drawing consumer attention to the wash or these extra services they offer, the lighting is very selective and does little to improve the overall environment within the vehicle wash facility.

Additionally, these lighted arches and signs are generally provided outside of or at the entrance end of the vehicle wash system in order to try and attract potential customers to take advantage of the vehicle wash services or to provide a positive impression for customers before they enter the vehicle wash system. More recently, as discussed in Applicants' U.S. Pat. No. 8,819,887, lights have been incorporated into vehicle wash components that rotate as the components rotate. This configuration allows the lights to be more easily visible to consumers while their vehicle is being treated such that the vehicle wash experience is less dark and intimidating. However, lighting effects have not been used in or adjacent the exit end of the vehicle wash system, which is generally the area visible to other motorists passing by the vehicle wash facility. Typically, any lights in other areas of the wash facility cannot be readily seen by others driving by the facility. Thus, the exit end of current vehicle wash systems are still dark, noisy and relatively intimidating to both customers and potential customers. Moreover, any lights in other parts of the wash facility have only a limited effect on the marketing of wash services to vehicles passing thereby as they cannot be readily seen.

Another disadvantage of current vehicle wash configurations is that they share a largely similar, utilitarian appearance that makes it correspondingly difficult for wash owners to provide a distinctive or memorable service offering to their customers. Lighted arches and signs that are used in existing wash facilities do little to overcome this problem as any attempted branding created thereby is obstructed to vehicle occupants during the wash process, as discussed above. Moreover, while the lighted brushes in U.S. Pat. No. 8,819,887 provide significant improvements in this regard, the dark exit end, which is the last portion of the wash system encountered by vehicles, can negatively affect a user's wash experience.

It would thus be desirable to provide a vehicle wash component that addresses these issues.

SUMMARY OF THE INVENTION

It is therefore an aspect of the present disclosure to provide a lighted dryer assembly for a vehicle wash facility that provides improved aesthetics.

It is another aspect of the present disclosure to provide a lighted dryer assembly for a vehicle wash facility that enhances customer experience during the wash process.

It is a further aspect of the present disclosure to provide a lighted dryer assembly for a vehicle wash facility that assists in creating and/or enhancing brand recognition.

It is a still another aspect of the present disclosure to provide a lighted dryer assembly for a vehicle wash facility that can brighten the environment therein and particularly at an exit end of the wash facility.

It is yet another aspect of the present disclosure to provide a lighted dryer assembly for a vehicle wash facility that yields enhanced brightness and aesthetics when not in use.

It is still yet another aspect of the present disclosure to provide a lighted dryer assembly for a vehicle wash facility that provides confirmation to a customer that a particular event is occurring, such as an ordered service.

In accordance with the above and the other aspects of the present disclosure, a lighted dryer assembly is provided. The lighted dryer assembly includes a housing portion having a generally hollow interior. The housing having an air inlet portion disposed adjacent an upper portion of the housing. A blower assembly disposed adjacent the air inlet portion for drawing air into the housing portion. The housing including a nozzle portion configured to emit high velocity air therefrom for removing water from an exterior surface of a vehicle while disposed in a vehicle treatment area. The housing being constructed of a translucent material and including a light source disposed therein and configured to emit light that can be seen by a vehicle disposed in the vehicle treatment area.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE INVENTION

Figure 1:
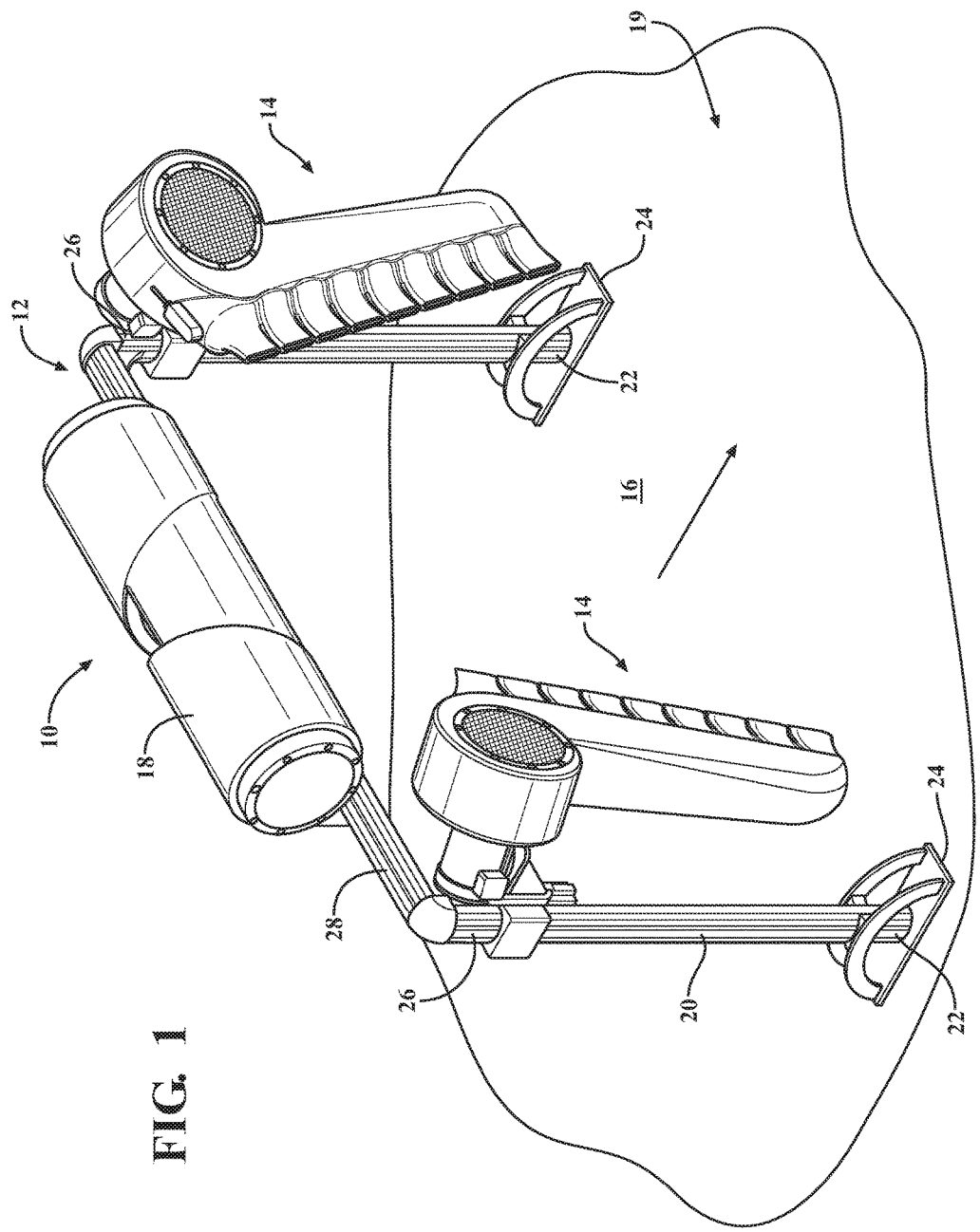
FIG. 1 is a perspective view of a lighted vehicle wash dryer assembly including a pair of opposing blower assemblies in accordance with an aspect of the present disclosure.
Figure 2:
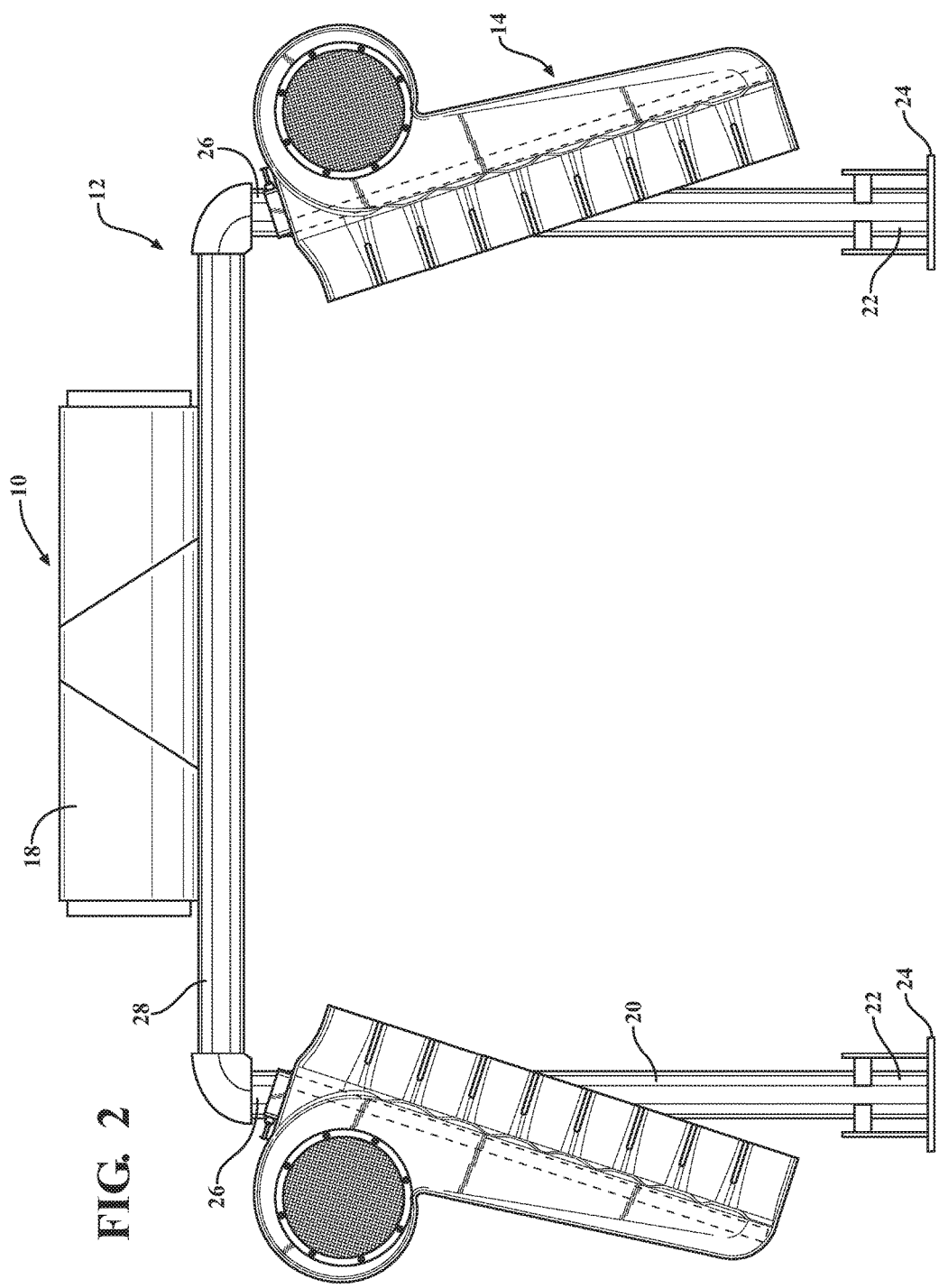
FIG. 2 is a front view of a lighted vehicle wash dryer assembly including a pair of opposing blower assemblies in accordance with an aspect of the present disclosure.

According to an aspect, the present disclosure relates to a treatment component for a vehicle wash system. More specifically, the present disclosure relates to a dryer assembly 10 for use in removing excess water from an exterior surface of a vehicle as part of a vehicle wash process. According to an aspect, the dryer assembly 10 may emit high velocity air onto a vehicle exterior to remove excess water therefrom. According to a further aspect, the dryer assembly 10 may be configured to emit water and air in order to remove water and/or soap from a vehicle exterior. An exemplary device for emitting water and air is disclosed in Applicant's co-pending application Ser. No. 14/673,157, filed Mar. 30, 2015, and entitled "Vehicle Treatment Apparatus that Emits Air and Water", which is hereby incorporated by reference herein.

According to an aspect, the dryer assembly 10 may be utilized as part of a vehicle wash system. It will be appreciated that the vehicle wash system may be configured as a tunnel car wash where a vehicle is conveyed through the wash process by a conveyor or the like as is known in the art. Alternatively, the vehicle wash system may be configured as a roll-over type system where the vehicle remains stationary and the various treatment components may be translated and/or moved with respect to the vehicle to perform the vehicle wash process. The disclosed dryer assembly may be employed in connection with other suitable wash processes and systems as are known. According to an aspect, the vehicle wash system may be housed within a vehicle wash facility having an entrance end where a vehicle enters, an exit end where the vehicle leaves, and a vehicle treatment area where the vehicle is cleaned. It will be appreciated that the disclosed dryer assembly 10 could also be employed in connection with a variety of other applications outside of a vehicle wash system, such as a manual wash or self-serve wash process.

According to a further aspect, an exemplary vehicle wash system into which the disclosed component may be incorporated can include a plurality of vehicle wash components that engage and/or treat the exterior of a vehicle as it passes through the vehicle wash facility to effectuate a vehicle wash process. For example, the components can include a rinse arch, which sprays water onto a vehicle to wet the exterior surface for further processing. Another component can include a bubble device that generates bubbles and emits them directly onto a vehicle exterior in order to provide a supply of soap for cleaning purposes. Other components may include one or more top brushes for contacting a top exterior surface of a vehicle, a plurality of side brushes for contacting side exterior surfaces of a vehicle and a plurality of wrap brushes for contacting front and back surfaces of a vehicle. Another component may include wheel scrubbers for engaging vehicle wheels. According to a further aspect, the system can include a wheel polishing device for treating vehicle wheels.

It will be appreciated that more, less or different wash components may be employed. Additionally, multiples of the same components may be employed as part of the system, as desired. Further, the components may take on a variety of different configurations. Moreover, the order, placement and sequence of the components within the system may also vary. According to an aspect, the components may be designed to engage and/or treat a vehicle disposed within the vehicle treatment area of the vehicle wash facility.

With reference to FIG. 1, the dryer assembly 10 can include a frame portion 12, a pair side blower assemblies 14, which are disposed on the frame portion 12 on either side of a vehicle treatment area 16 to direct air onto side vehicle surfaces, and an overhead blower assembly 18 disposed on the frame 12 to direct air onto an upper exterior surface of a vehicle in the vehicle treatment area 16. The dryer assembly 10 may be disposed at or adjacent an exit end 19 of the vehicle treatment area 16. According to an aspect, the frame portion 12 can include a pair of leg portions 20, which are disposed on either side of the vehicle treatment area 16. Each leg portion 20 can include a lower end portion 22, which can engage a base portion 24 that rests on the ground to hold the leg portions 20 in a generally vertical position. The leg portions 20 can each also include an upper end portion 26 which can engage an overhead cross-piece portion 28 that spans the vehicle treatment area 16. It will be appreciated that the dryer assembly 10 and the frame portion 12 can take on a variety of different configurations. It will also be appreciated that more or less or differently configured blower assemblies 14 may be employed on the frame portion 12 and that they may be disposed in different locations on the frame portion 12.

FIGS. 5 through 8 schematically illustrate a blower housing 30 for a blower assembly 14 in accordance with an aspect of the disclosure. According to an aspect, the blower housing 30 can include an upper head portion 32, a body portion 34, and an outlet portion 36 including a plurality of nozzle portions 38. According to an aspect, the blower housing 30 may be a single integral structure that is formed from a plastic material in a rotational molding process. According to an aspect, the housing may be formed of a polyurethane material. It will be appreciated that the blower housing 30 may be formed from a variety of different materials and that a variety of other suitable processes may be employed. According to a still further aspect, the blower housing 30 may be formed of a transparent or translucent material. Additionally, the blower housing 30 may be formed in a variety of different colors.

Figure 5:
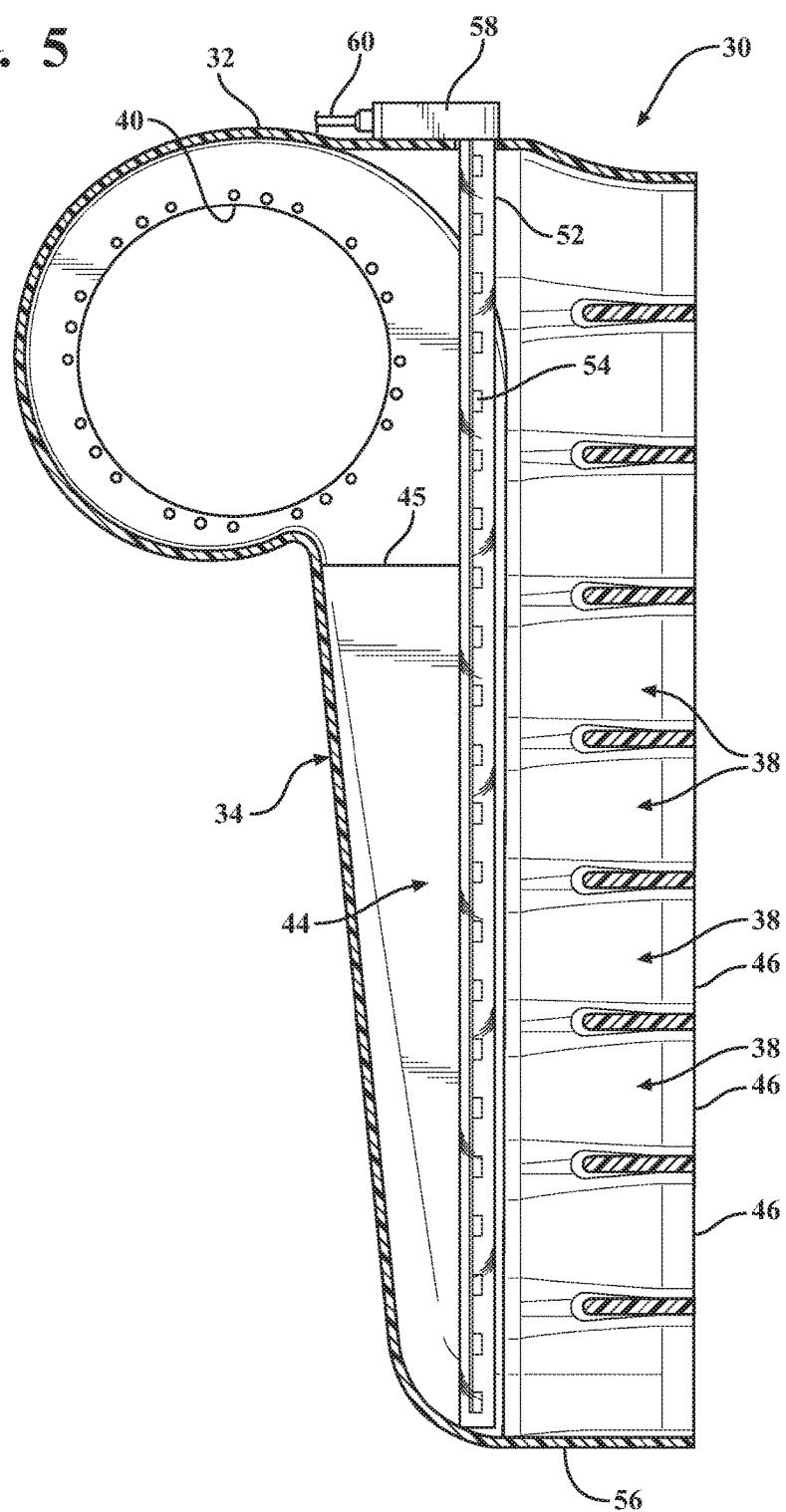
FIG. 5 is a cross-sectional view of the blower assembly housing of FIG. 3 in the direction of the arrows 5-5.
Figure 6:
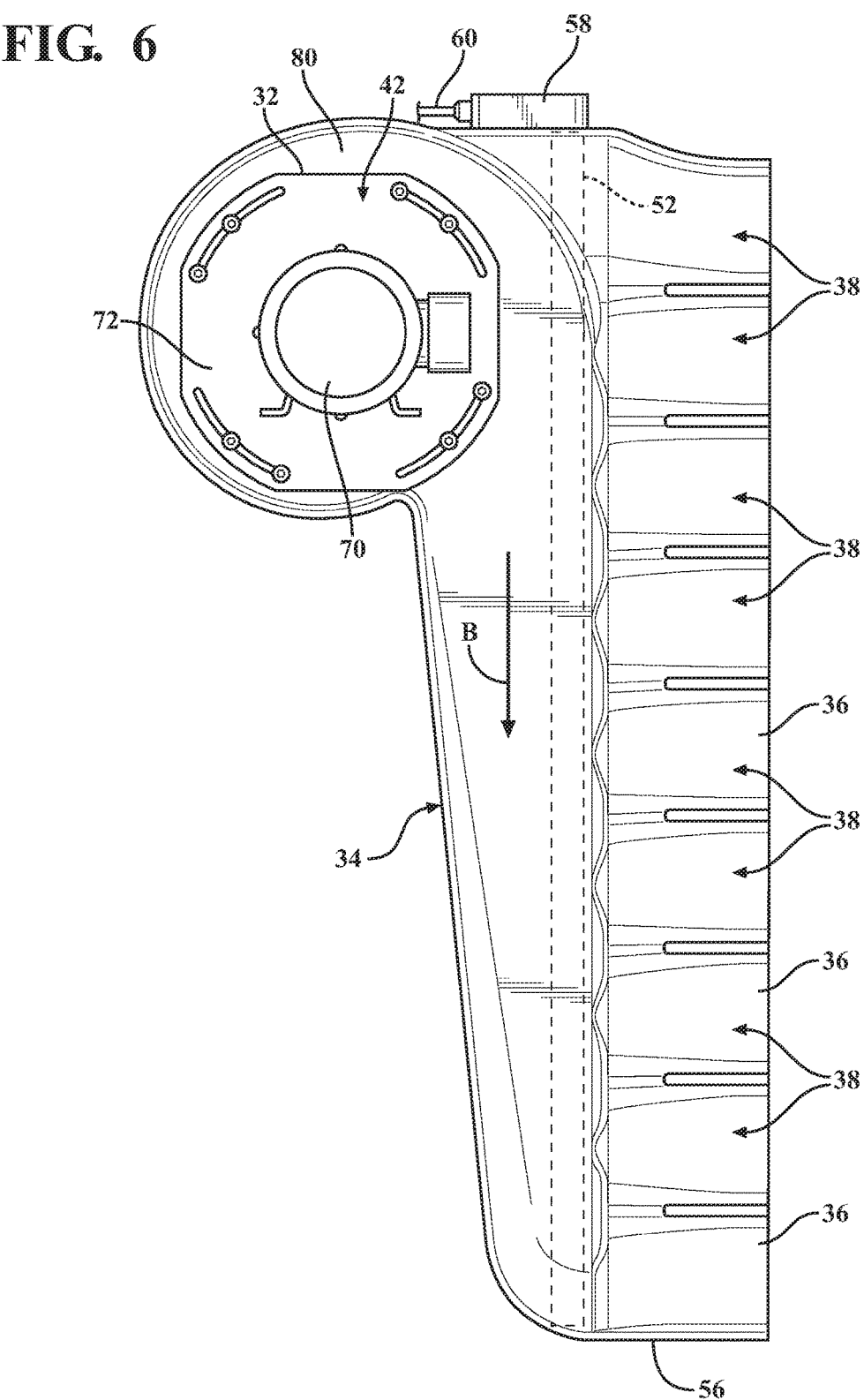
FIG. 6 is a front view of a blower assembly in accordance with an aspect of the present disclosure.
Figure 7:
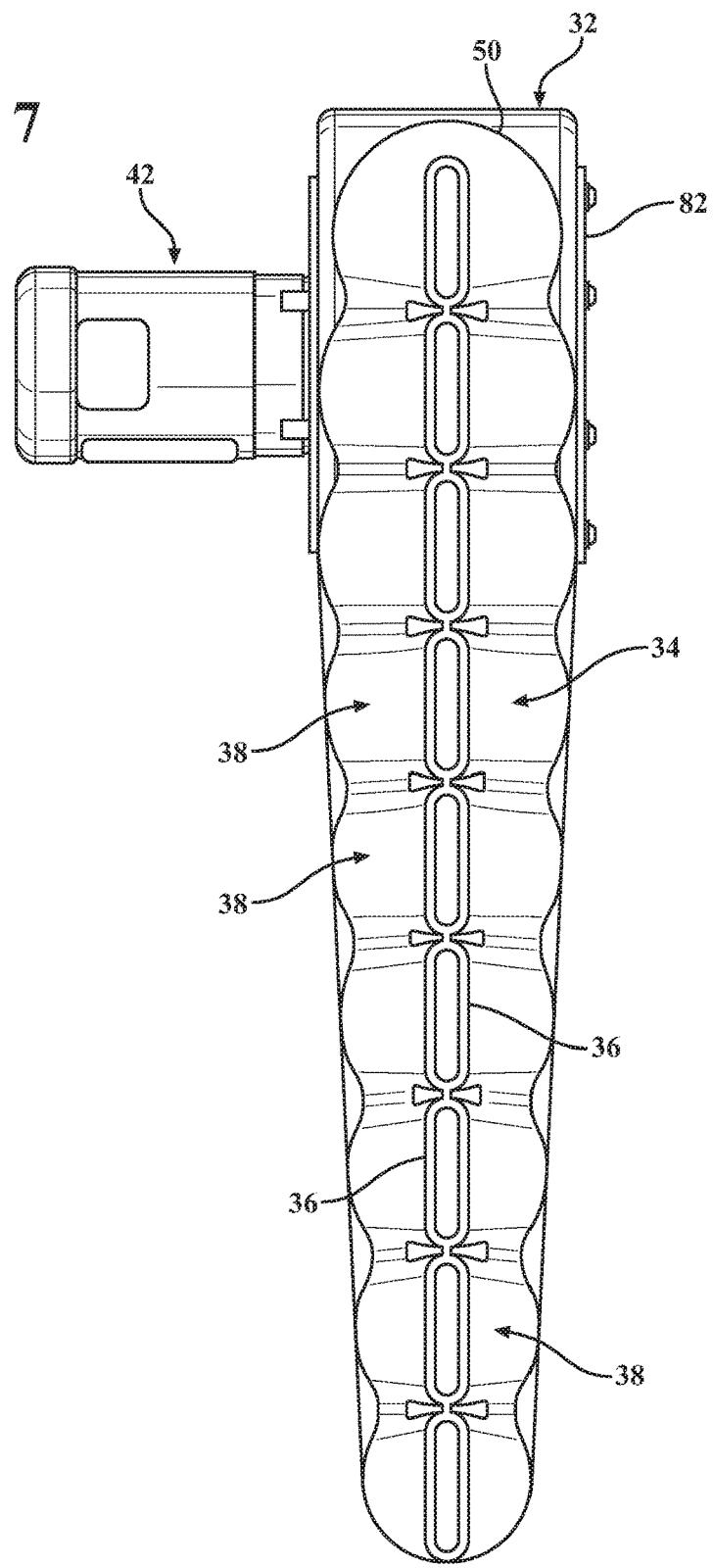
FIG. 7 is a side view of a blower assembly in accordance with an aspect of the present disclosure.

According to a further aspect, the upper head portion 32 can include a motor assembly opening 40 for receipt of a motor unit 42, as shown best in FIGS. 5 through 7. The motor assembly opening 40 may be in communication with an interior blower cavity 44 disposed in the body portion 34 by way of an inlet opening 45. According to an aspect, the blower cavity may serve as an air passageway that conveys air from the motor unit 42 toward a lower portion of the housing 30 in a direction generally indicated by arrow B. The interior blower cavity 44 may be in communication with each of the plurality of nozzle portions 38. According to another aspect, the nozzle portions 38 may be configured to generally taper outwardly from the body portion 34 to an air exit outlet 46. According to an aspect, the air exit outlets 46 each have an area that is substantially smaller than the size of an area of the inlet opening 45. The nozzle portions 38 can have a variety of other configurations.

According to another aspect, a clearance opening 48 may be formed in an upper surface 50 of the body portion 34. According to a further aspect, a clear elongated housing structure 52, such as a clear PVC pipe may be inserted into the clearance opening 48 and into the interior blower cavity 44. The opening may serve to retain and secure the illumination source. According to yet another aspect, an illumination source 54 may be disposed in the elongated housing structure 52 so that one or more illumination sources may be located within the blower housing 30. According to an aspect, a retention mechanism may be disposed in the housing for retaining an end of the illumination source opposite the clearance opening. The illumination source 54 may be an array of light emitting diodes (LEDs); however a variety of other suitable illumination sources may be employed. According to an aspect, the illumination sources may be LEDs that are configured to emit light in accordance with the RGB color convention as directed by a controller 62. For example, the illumination source 54 may be directed to emit a variety of different colors. According to another aspect, the controller 62 may be configured to cycle the illumination source 54 through a variety of different colors. According to an aspect, the elongated housing structure 52 may be configured as a pipe and may extend the full height from the upper surface 50 to the lower surface 56 of the blower housing 30. It will be appreciated that it could extend a lesser portion of the height.

According to another aspect, the light source 54 could be otherwise associated with the housing such that it could illuminate the interior of the blower housing 30. The light source 54 could be disposed behind the blower housing 30 and the blower housing 30 could have an opening disposed adjacent the light source 54 such that the light could illuminate the interior of the blower housing 30 and provide an illumination of the housing. According to a further aspect, the blower housing 30 could serve as a light pipe such that the light source 54 is positioned to illuminate the interior of the blower housing 30 and make the blower housing glow to provide a lighted effect. It will be appreciated that the light source 54 could be disposed in a variety of other locations to illuminate the blower housing 30.

It will also be appreciated that the housing structure 52 can take on a variety of different configurations and may be formed of different materials and may be formed of different colors. For example, the elongated housing structure 52 may be formed of a translucent material. It will be appreciated that any number of illumination sources 54 may be employed within the blower housing 30. The illumination sources 54 may be connected to or disposed within the blower housing 30 in a variety of suitable ways. It will be further appreciated that more than one elongated housing structure 52 may be disposed in the blower housing 30 to hold multiple illumination sources 54. It will also be appreciated that the elongated housing structure 52 and the illumination sources 54 can be combined in a single unit. Alternatively, illumination sources 54 may be disposed in the blower housing 30 independent from and without any elongated housing structure 52.

Figure 3:
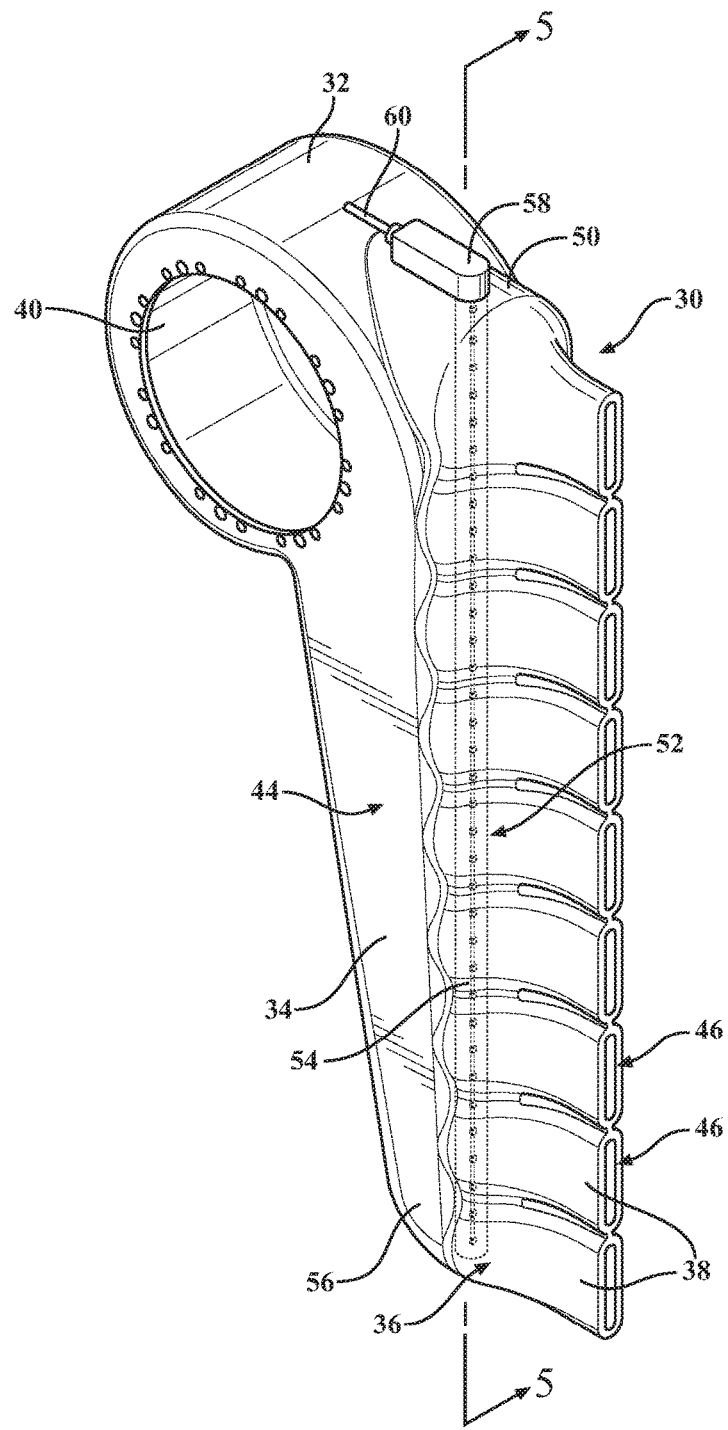
FIG. 3 is a schematic illustration of a blower assembly housing with an illumination source therein in accordance with an aspect of the present disclosure.
Figure 4:
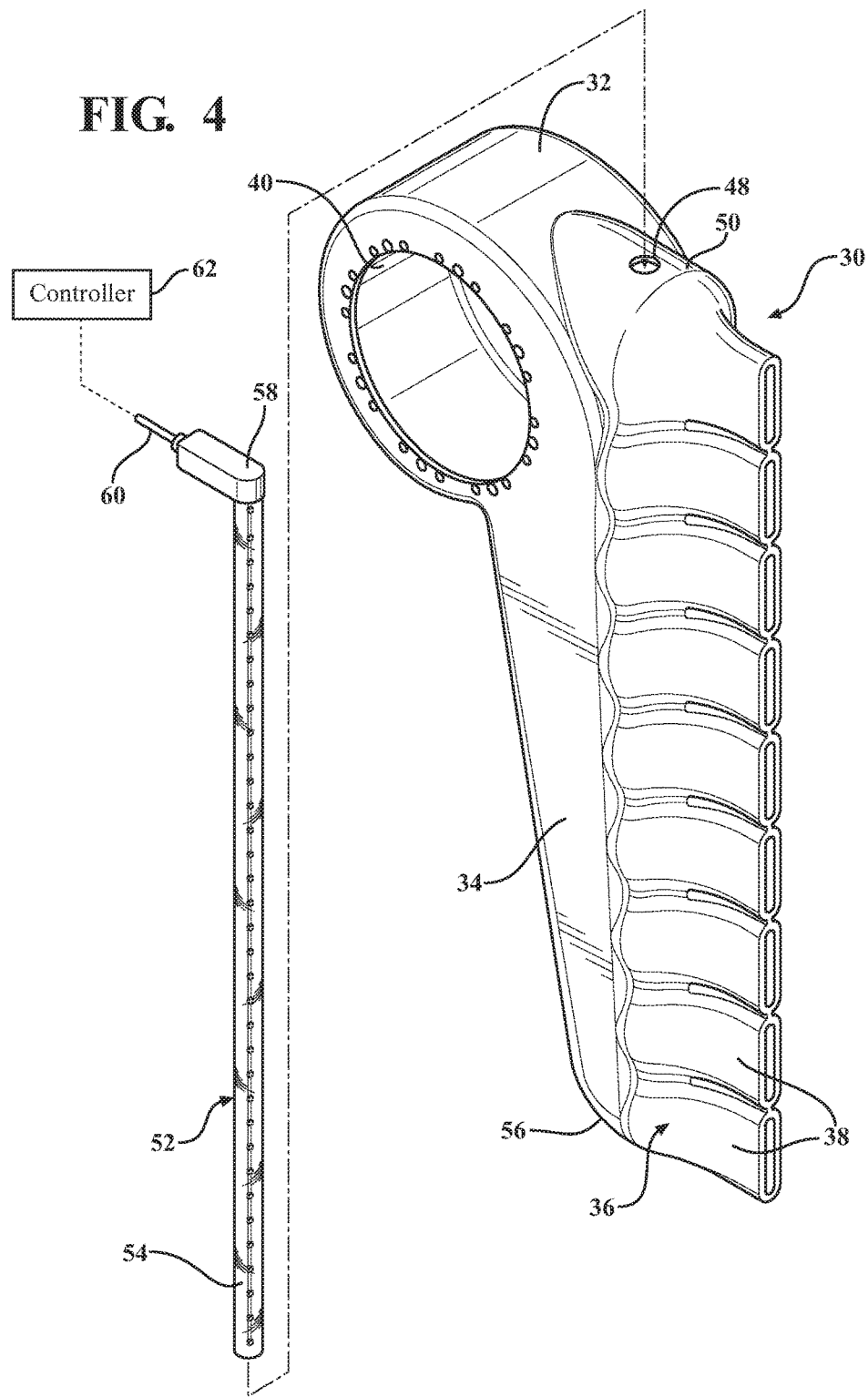
FIG. 4 is an exploded view of a blower assembly and illumination source in accordance with an aspect of the present disclosure.

According to an aspect and with reference to FIGS. 3 and 4, a conduit box 58 may be disposed on the upper surface 50 of the body portion 34. The conduit box 58 may be configured to effect an electrical connection between the illumination sources 54 and an electrical power source (not shown). According to an aspect, an electrical cord 60 may extend from the conduit box 58 for communication with a controller 62 to control lighting of the illumination sources 54. As will be appreciated, the conduit box 58 can include components for assisting the enabling and disabling of the illumination sources 54, as directed by the controller 62. According to a further aspect, the controller can turn the illumination sources 54 on to emit light through the housing 30 (enabled mode) and off such that no light is emitted from the illumination sources 54 (disabled mode). It will also be appreciated that the controller 62 can be in communication with other light sources in the vehicle wash system such that the illumination sources 54 may be activated and synchronized with other light sources in connection with a package confirmation function, as is disclosed in Applicant's co-pending U.S. patent application Ser. No. 14/687,704, filed Apr. 15, 2015, and entitled "Vehicle Wash Package Selection Confirmation System" and/or an active site marketing function, as is disclosed in Applicant's co-pending U.S. patent application Ser. No. 14/695,773, filed Apr. 24, 2015, and entitled "Active Site Marketing Vehicle Wash System", both of which are hereby incorporated by reference as though set forth fully herein.

FIGS. 5 and 6 illustrate a motor unit assembly 42 for a blower assembly 14 in accordance with an aspect of the disclosure and attachment thereto to the blower housing 30. According to an aspect, the motor unit assembly 42 can include a motor 70. The motor 70 may be in communication with a mount plate 72 which may be employed to secure the motor unit assembly 42 to a first side 80 of the upper head portion 32 of the blower housing 30. According to an aspect, the motor 70 may include a high speed impeller 74 via an opening in the mount plate 72. According to a further aspect, in operation, upon actuation of the motor unit 70, the impeller 74 may be caused to rotate to draw air into the second side 82 of the upper head portion 32. An air inlet portion may be secured to the second side 82 of the upper head portion 32. The air inlet portion may have a mesh layer disposed over an air inlet opening to prevent large objects from being drawn into the upper head portion 32. According to another aspect, the motor 70 may be an electric motor that is in communication with a source of power. However, a variety of other suitable types of motors or other power sources may be employed.

According to an aspect, the illumination source 54 has an enabled mode and a disabled mode. In the enabled mode, the illumination source 54 may be activated by the controller 62 enabled such that it emits light. The emitted light can pass through the clear elongated housing structure 52 and through the translucent blower housing 30. According to an aspect, the illumination source 54 can also cause the body of the blower housing 30 to glow, which provides a unique aesthetic appearance. In the disabled mode, the illumination source 54 may be turned off by the controller 62 such that no light is emitted therefrom and the blower housing 30 may be dark. The illumination sources 54 can be disposed in the housing in a variety of different locations and can be secure to the outside of the housing or formed as an integral unit with the housing.

Figure 8:
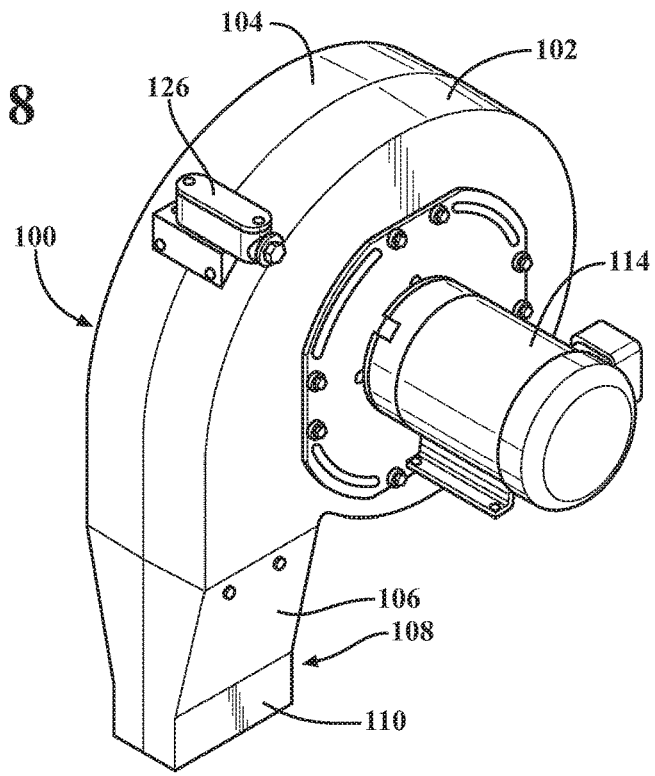
FIG. 8 is a perspective view of a lighted vehicle wash dryer assembly in accordance with an aspect of the present disclosure.
Figure 9:
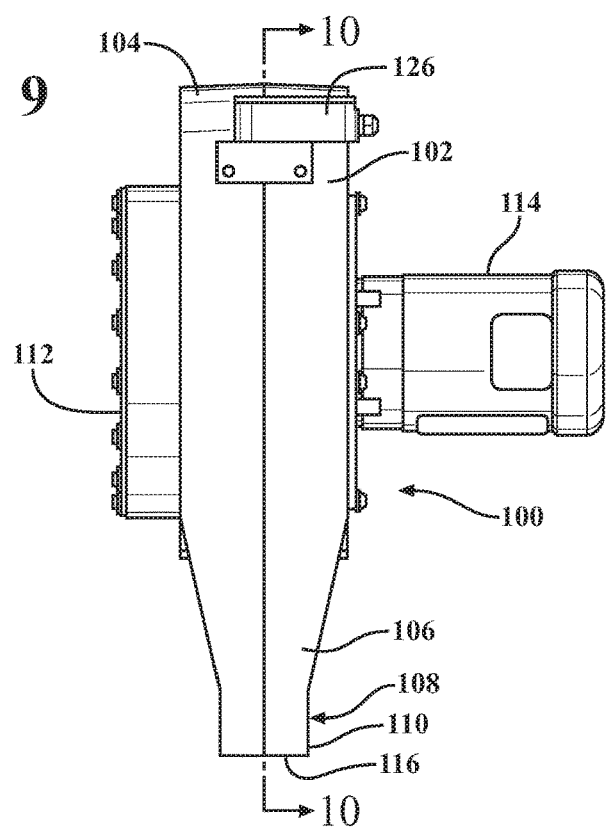
FIG. 9 is a side view of a lighted vehicle wash dryer assembly in accordance with another aspect of the present disclosure.
Figure 10:
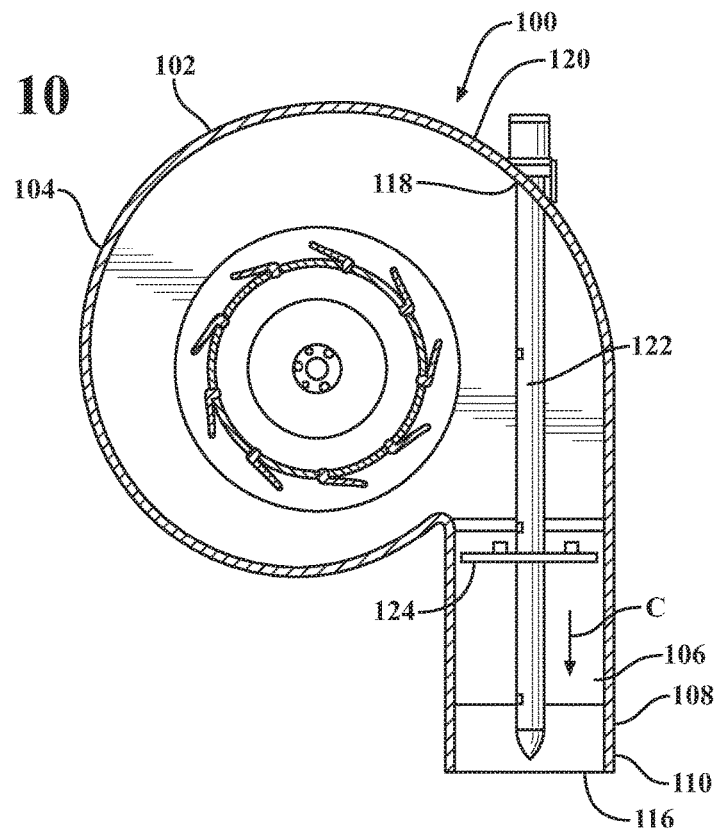
FIG. 10 is a cross-sectional view of the lighted vehicle wash dryer assembly of FIG. 9 in the direction of the arrows A-A.
Figure 11:
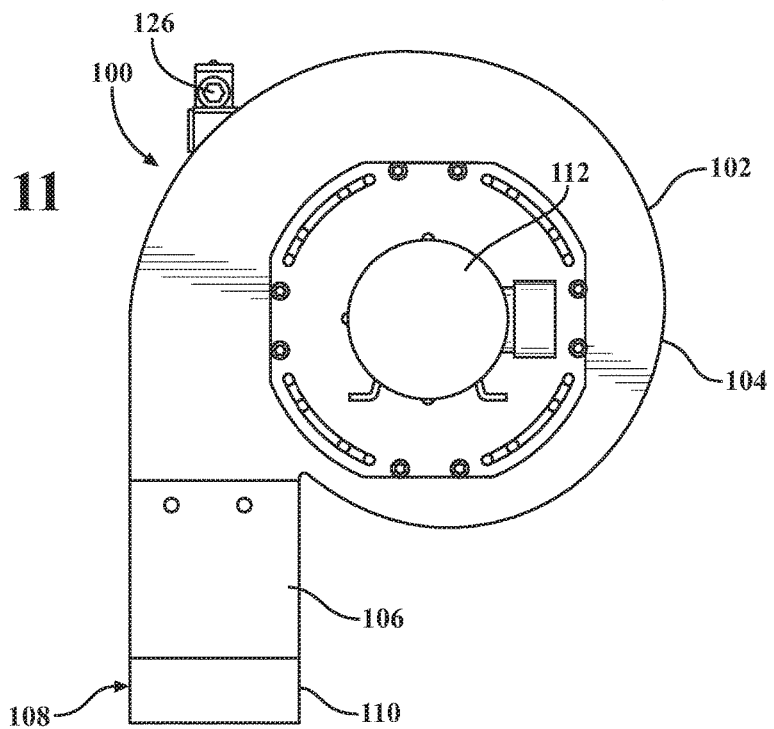
FIG. 11 is another side view of a lighted vehicle wash dryer assembly in accordance with another aspect of the present disclosure.

FIGS. 8 through 10 illustrate a blower assembly 100 according to another aspect of the disclosure. As will be appreciated, the blower assembly 100 may be disposed on a frame portion and located on either side of the vehicle treatment area to direct air onto side vehicle surfaces. It will also be appreciated that the blower assembly 100 could be disposed on a frame portion to direct air onto an upper exterior surface of a vehicle in the vehicle treatment area. According to an aspect, the blower assembly 100 may be disposed at or adjacent an exit end of the vehicle treatment area.

According to an aspect, the blower assembly 100 may include a housing portion 102, including a head portion 104, an air passage portion 106 and an outlet portion 108, including a nozzle portion 110. According to another aspect, the housing portion 102 may be a single integral structure that is formed of a plastic material in a rotational molding process or a blow molding process. The housing portion 102 may be formed of a variety of different materials and from a variety of suitable processes. According to a still further aspect, the housing portion 102 may be formed of a transparent or translucent material. The housing portion 102 may be formed in a variety of different colors, shapes and configurations.

According to a further aspect, the head portion 104 may include an inlet opening 112 and a motor unit 114, which is in communication with the inlet opening 112 to draw air into the housing portion 102. According to an aspect, the motor unit 114 may be configured as a conventional blower with an impeller and an electric motor, as is known. According to another aspect, air drawn into the inlet opening 112 may be conveyed to the air passage portion 106. As shown, the air flow through the housing portion 102 may be generally downward in the direction of the arrow C shown in the FIG. 10. It will be appreciated that the term downward is only utilized for illustrative purposes and is not intended to be limiting. As shown, the nozzle portion 110 may be configured to taper generally outwardly from the outlet portion 108. As will be appreciated, the nozzle portion 110 includes an exit opening 116 that may have a substantially smaller area than that of the inlet opening 112 such that high velocity air may be emitted therefrom to force water off an exterior surface of the vehicle. It will also be appreciated that the nozzle portion 110 can have a variety of different configurations.

According to an aspect, a clearance opening 118 may be formed in an upper surface 120 of the housing portion 102. According to a further aspect, a light source 122 may be inserted into the clearance opening 118 such that it is disposed in the housing portion 102 and resides in the air passage portion 106. According to another aspect, in the enabled mode, the light source 122 may emit light that may pass through the housing portion 102 and may be seen from an exterior of the blower assembly 100. According to another aspect, the light source 122 may be secured within the housing portion 102 by a securing mechanism 124. The securing mechanism 124 may be a bracket or other suitable mounting structure. A variety of different ways for securing the light source 122 within the housing portion 102 may be employed. As discussed above, the light source 122 may be disposed within a plastic housing structure. The light source 122 may be configured as an elongated array of LEDs. However, a variety of other suitable illumination sources may be employed.

Additionally and as shown in FIGS. 8 through 11, a conduit box 126 may be disposed on the upper surface 120 of the housing portion 102. The conduit box 126 may be configured to effect an electrical connection between the light source 122 and an electrical power source (not shown). According to an aspect, the light source 122 may be in communication with a controller to control operation of the light source 122 and activation of the enabled and disabled mode.

Figure 12:
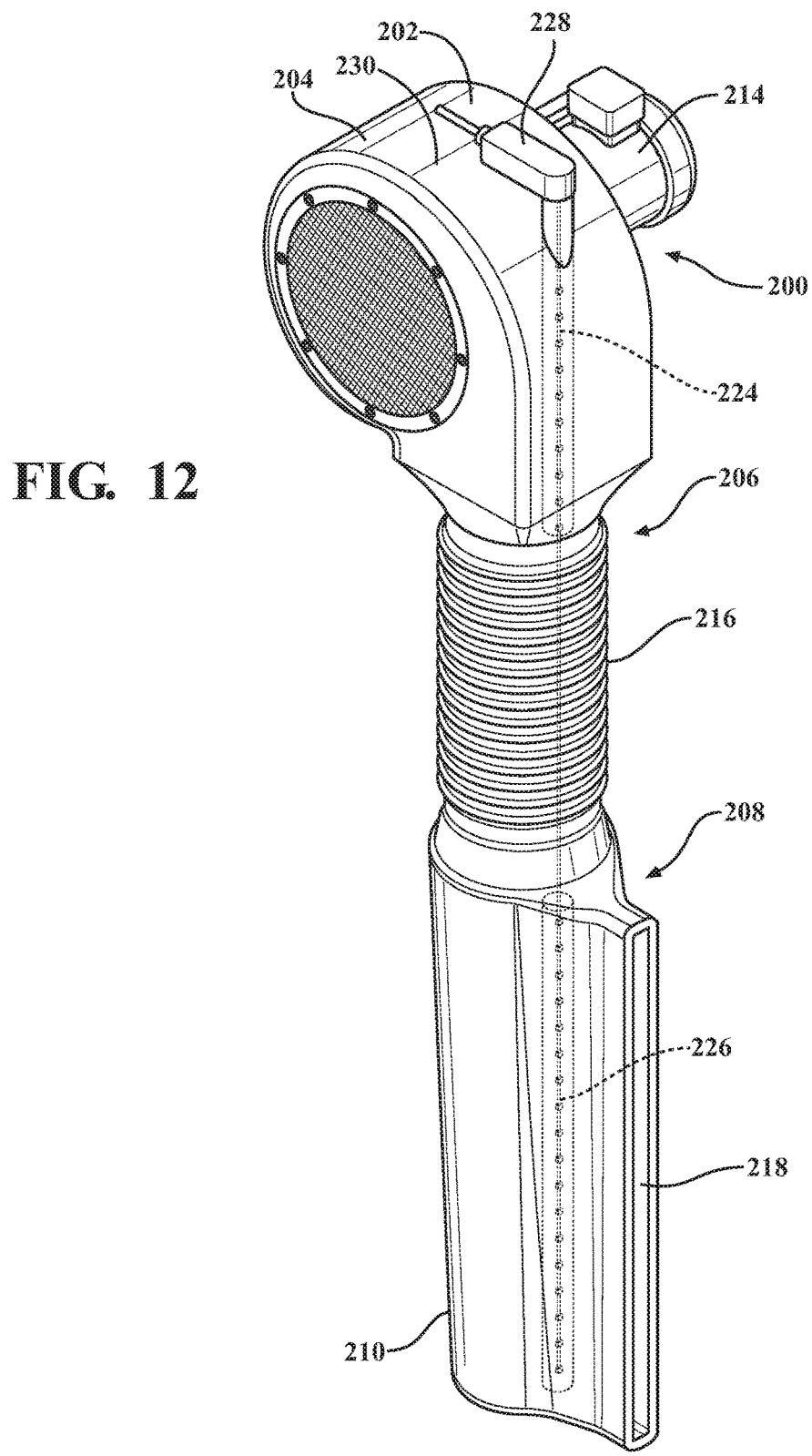
FIG. 12 is a perspective view of a lighted vehicle wash dryer assembly according to still a further aspect of the present disclosure.
Figure 13:
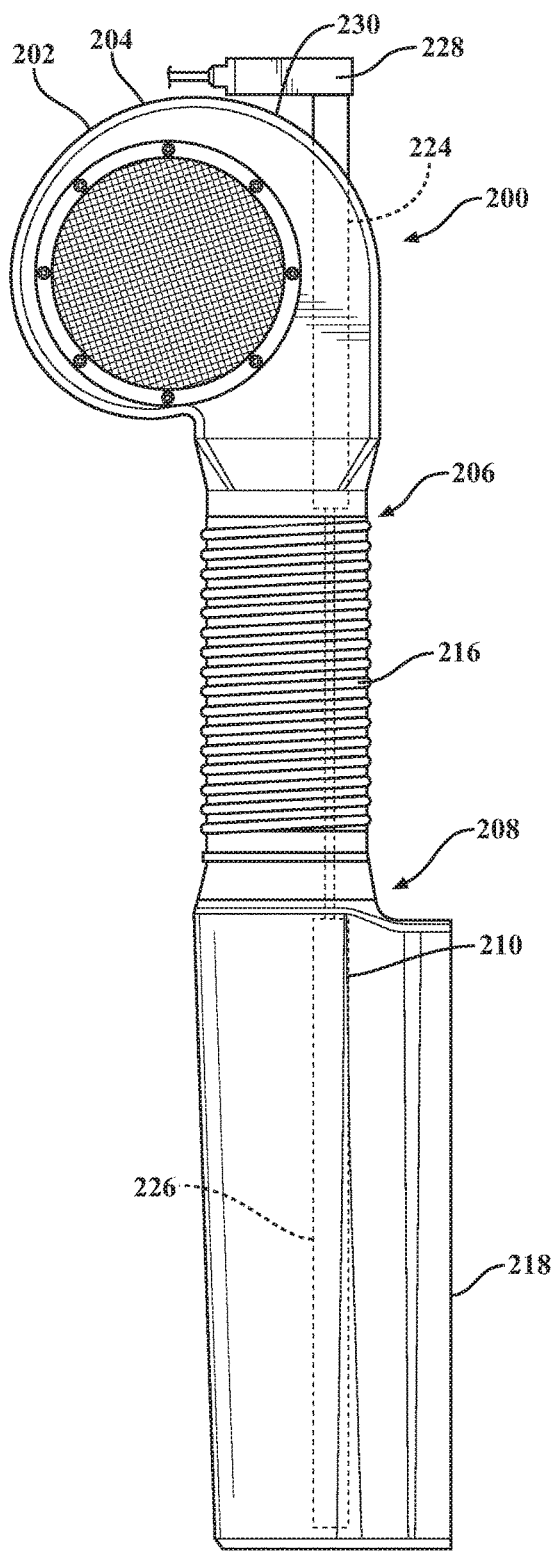
FIG. 13 is a front view of a lighted vehicle wash dryer assembly according to still a further aspect of the present disclosure.

FIGS. 12 and 13 illustrate a blower assembly 200 according to a still further aspect of the disclosure. As will be appreciated, the blower assembly 200 may be disposed on a frame portion and located on either side of the vehicle treatment area to direct air onto side vehicle surfaces. It will also be appreciated that the blower assembly 200 could be disposed on a frame portion to direct air onto an upper exterior surface of a vehicle in the vehicle treatment area. According to an aspect, the blower assembly 200 may be disposed at or adjacent an exit end of the vehicle treatment area.

According to an aspect, the blower assembly 200 may include a housing portion 202, including a head portion 204, an air passage portion 206 and an outlet portion 208, including a nozzle portion 210. According to another aspect, the housing portion 202 may be a single integral structure that is formed of a plastic material in a rotational molding process or blow molding process. The housing portion 202 may be formed of a variety of different materials and from a variety of suitable processes. According to a still further aspect, the housing portion 202 may be formed of a transparent or translucent material. The housing portion 202 may be formed in a variety of different colors, shapes and configurations.

According to a further aspect, the head portion 204 may include an inlet opening 212 and a motor unit 214, which is in communication with the inlet opening 212 to draw air into the housing portion 202. According to an aspect, the motor unit 214 may be configured as a conventional blower with an impeller and an electric motor, as is known. According to another aspect, air drawn into the inlet opening 212 may be conveyed to the air passage portion 206. As shown, the air flow through the housing portion 202 may be generally downward in the direction of the arrow D shown in the FIG. 13. It will be appreciated that the term downward is only utilized for illustrative purposes and is not intended to be limiting.

According to an aspect, the air passage portion 206 may include a passage within the housing portion 202 and a hose portion 216. As shown, the hose portion 216 may extend between and connect the housing portion 202 with the nozzle portion 210. According to another aspect, the nozzle portion 210 can include an exit opening 218. As shown, the exit opening 218 may be configured to emit high velocity air in a direction generally perpendicular to the direction of air flow (D) through the air passage portion 206. As shown, the nozzle portion 210 may be configured to taper generally outwardly from the outlet portion 208. As will be appreciated, the exit opening 218 may have a substantially smaller area than that of the inlet opening 212 such that high velocity air may be emitted therefrom to force water off an exterior surface of the vehicle. It will also be appreciated that the nozzle portion 210 can have a variety of different configurations.

According to an aspect, a clearance opening 220 may be formed in an upper surface 222 of the housing portion 202. According to a further aspect, a light source 224 may be inserted into the clearance opening 220 such that it is disposed in the housing portion 202 and resides in the air passage portion 206. According to another aspect, in the enabled mode, the light source 224 may emit light that may pass through the housing portion 202 and may be seen from an exterior of the blower assembly 200. According to another aspect, the light source 224 may be secured within the housing portion 202 by a variety of suitable securing or mounting structures. As discussed above, the light source 224 may be disposed within a plastic housing structure. The light source 224 may be configured as an elongated array of LEDs. However, a variety of other suitable illumination sources may be employed. According to another aspect, the light source 226 may be disposed in the nozzle portion 210. It will be appreciated that the light source 226 may be instead of or in addition to the light source 224. Alternatively, it will be appreciated that the light sources 224, 226 may be configured as a singular LED strip. It will further be appreciated that any number of light sources may be employed and that they can be disposed in a variety of suitable locations.

Additionally and as shown in FIGS. 12 through 13, a conduit box 228 may be disposed on the upper surface 230 of the housing portion 202. The conduit box 228 may be configured to effect an electrical connection between the light source 242, 226 and an electrical power source (not shown). According to an aspect, each of the light sources 224, 226 may be in communication with a controller to control operation of the light sources 224, 226 and activation of the enabled and disabled mode.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of forming a lighted dryer unit, comprising:
   placing a translucent plastic resin into a mold having a mold cavity defining a shape of a dryer housing with an inlet opening, a body and at least one outlet nozzle for emitting high velocity air;
   molding the dryer housing such that it has a hollow interior and a wall thickness sufficient to withstand air pressure within the housing and permit light emitting from a light source associated with the housing to pass therethrough; and
   disposing at least one light source completely enclosed within a protective cover within the hollow interior of the dryer housing.

2. The method of claim 1, wherein the plastic resin is a polyurethane material.

3. The method of claim 1, wherein the dryer housing includes a cut-off segment and further comprising:
   forming at least one portion of the at least one outlet nozzle such that it is disposed above the cut-off segment.

4. The method of claim 3, further comprising:
   forming at least one portion of the at least one outlet nozzle above the cut-off segment.

5. The method of claim 4, wherein the at least one outlet nozzle includes a plurality of individual nozzle segments, further comprising:
   forming at least one of the plurality of nozzle segments above the cut-off segment and at least one of the plurality of nozzle segments below the cut-off segment.

6. The method of claim 5, further comprising:
   forming the housing such that the plurality of nozzle segments extend substantially along an entire height of the housing.

7. The method of claim 1, further comprising:
forming the dryer housing with a generally hollow interior for receipt of the at least one light source in the hollow interior.

8. The method of claim 7, further comprising:
molding the housing from a blow molding or rotational molding process.

9. The method of claim 8, further comprising:
forming at least one receptacle in the dryer housing for receipt of the at least one light source.

10. The method of claim 1, further comprising:
injecting the translucent plastic resin into the mold.

11. A method of forming a lighted dryer unit, comprising:
providing a mold with a hollow cavity defining a shape of a dryer housing having an inlet opening, a body portion and at least one outlet nozzle;
placing a translucent plastic material into the mold;
forming the dryer housing with a generally predetermined wall thickness and a hollow interior;
disposing an impeller unit into the housing adjacent the inlet opening for drawing air into the housing and emitting high velocity air from the at least one outlet nozzle;
securing at least one light source in the hollow cavity;
whereby the predetermined wall thickness is sufficient to withstand air pressure generated from the impeller unit and allow light emitted from the at least one light source to pass therethrough.

12. The method of claim 11, further comprising:
forming the dryer housing in a rotational molding or blow molding process.

13. The method of claim 11, further comprising:
injecting the plastic material into the mold.

14. The method of claim 11, wherein the plastic resin is a polyurethane material.

15. The method of claim 11, wherein the impeller unit includes a cut-off segment and further comprising:
forming the at least one outlet nozzle such that it is disposed above the cut-off segment.

16. The method of claim 11, further comprising:
forming at least one of the at least one outlet nozzle above the cut-off segment and at least one of the at least one outlet nozzle below the cut-off segment.

17. The method of claim 16, further comprising:
forming a plurality of outlet nozzles above the cut-off segment.

18. The method of claim 11, further comprising:
forming the housing such that the at least one outlet nozzle includes a plurality of outlet nozzles extending substantially along an entire height of the housing.

19. The method of claim 18, further comprising:
forming a light source retaining mechanism in the dryer housing for receipt of the at least one light source.

20. A method of forming a lighted dryer unit, comprising:
placing a translucent plastic resin into a mold having a mold cavity defining a shape of a dryer housing with an upper head portion defining an inlet opening, a body and at least one outlet nozzle for emitting high velocity air;
molding the dryer housing such that it has a hollow interior and a wall thickness sufficient to withstand air pressure within the housing and permit light emitting from a light source associated with the housing to pass therethrough;
forming the dryer housing to include a cut-off segment; and
forming at least one portion of the at least one outlet nozzle above the cut-off segment of the dryer housing.

21. The method of claim 20, further comprising:
forming the dryer housing in a rotational molding or blow molding process.

* * * * *